United States Patent [19]

Delaplace et al.

[11] Patent Number: 4,794,953
[45] Date of Patent: Jan. 3, 1989

[54] TORCH DEVICE WITH OXYGEN AND COMBUSTION GAS SUPPLY

[75] Inventors: Philippe Delaplace, Lausanne; Hans-Theo Steine, Chavannes, both of Switzerland

[73] Assignee: Castolin S.A., Saint-Sulpice, Switzerland

[21] Appl. No.: 917,017

[22] Filed: Oct. 9, 1986

[30] Foreign Application Priority Data

Oct. 9, 1985 [CH] Switzerland .................. 04371/85

[51] Int. Cl.[4] ............................................. F16K 7/00
[52] U.S. Cl. ............................ 137/630.19; 431/346; 137/628
[58] Field of Search ............... 431/354, 346; 137/606, 137/628, 630.19, 625.13

[56] References Cited

U.S. PATENT DOCUMENTS

| 1,494,747 | 5/1924 | Jenkins | 137/630.19 |
| 1,810,158 | 6/1931 | Campbell | 137/630.19 |
| 2,371,970 | 3/1945 | Marra | 137/630.19 |
| 3,200,872 | 8/1965 | Jackson et al. | 137/630.19 |

Primary Examiner—Randall L. Green
Attorney, Agent, or Firm—Hopgood, Calimafde, Kalil, Blaustein & Judlowe

[57] ABSTRACT

A torch device with a torch body having separate ducts for oxygen and combustion gas supply is disclosed, wherein regulating and shut-off valves are provided in the torch body in substantially opposite relationship. A common actuating device for the shut-off valves is adapted for completely closing the shut-off valve for the combustion gas before starting the closing of the shut-off valve for oxygen. All gas ducts inside the torch body are formed by bores extending parallely to each other, while connecting passages are formed by bores extending orthogonally thereto.

4 Claims, 1 Drawing Sheet

TORCH DEVICE WITH OXYGEN AND COMBUSTION GAS SUPPLY

The present invention relates to a torch device with a torch body having separate gas ducts for oxygen and a combustion gas, wherein these gas ducts each extend between a respective inlet opening adapted for connection to a corresponding gas source and an outlet opening adapted for connection to a mixing and guiding device which can be exchangeably coupled with the torch body, and wherein in each of the gas ducts are provided a regulating valve for controlling the respective gas flow rate as well as a shut-off valve for switching the respective gas flow on and off.

In the known torch devices there exists a considerable risk that the torch flame fires back up to the torch body, whereby a substantial damage of the device can occur and serious danger arises for the operating person.

It is an object of the present invention to provide a torch device in which on one hand the risk of back firing up to the torch body is considerably reduced and on the other hand the consequences of a backfiring, should it occur, are also significantly reduced.

In accordance with the invention, regulating valves are arranged contigously on one side of the torch body, a corresponding shut-off valve being arranged on the opposite side of the torch body substantially opposite each of the regulating valves, the outlet of each of the regulating valves being connected with the inlet of the corresponding shut-off valve and the inlets of the regulating valves and the outlets of the shut-off valves communicating respectively with the inlet and outlet openings of the corresponding gas ducts, said gas ducts being formed by bores in the torch body extending substantially parallel to each other and passages for connection and communication with the regulating valves and the shut-off valves being formed by bores in the torch body extending substantially orthogonal with respect to said gas ducts, and a common actuating device for the oxgen and the combustion gas shut-off valves is provided and arranged in such a way that, when switching-off, the shut-off valve for the combustion gas is completely closed before the closing of the shut-off valve for oxygen starts.

The measures according to the invention allow in particular to maintain a comparatively high gas velocity in the torch body uniformly over the whole length of the gas duct, thus substantially reducing the risk of the occurrence of backfiring, in particular when using an injector mixing device in the mixing and guiding device of the torch. Furthermore, the device according to the invention allows the presence of a very small gas volume inside the torch body itself, so that a possible backfiring only produces its effect on that small gas volume and is thus considerably less dangerous. In addition, the arrangement of the regulating valves upstream with respect to the shut-off valves allows a shutting off of the gas supply to the torch even when the regulating valves have been damaged in case of backfiring.

The invention will hereinafter be described in more detail on the basis of an example of an embodiment represented in the drawings. In the drawing.

Figure 1:
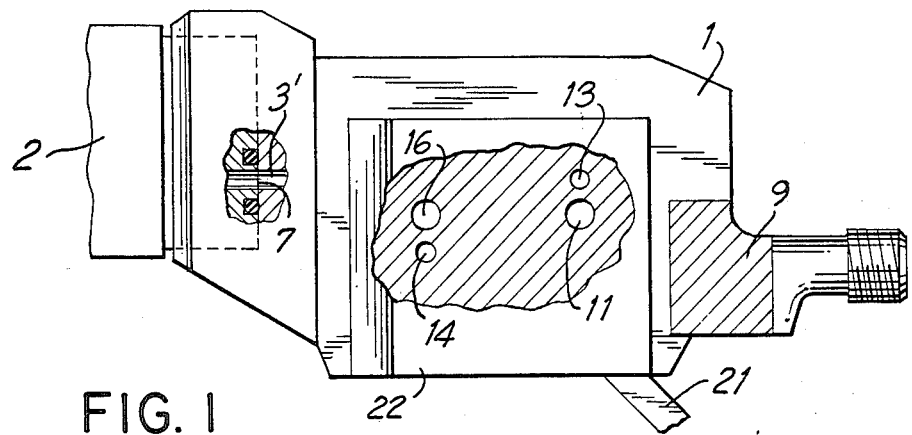
FIG. 1 shows a lateral view, partially in section, of a torch device according to the invention.
Figure 2:
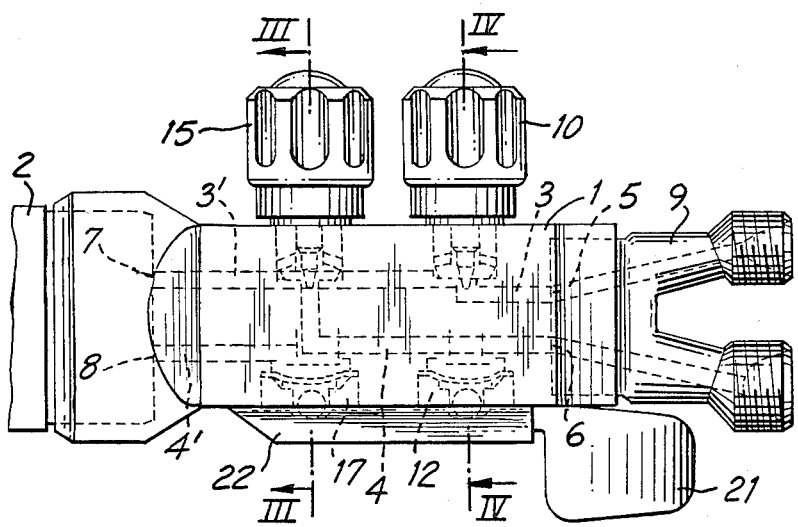
FIG. 2 shows a top view of the device of FIG. 1.

The torch device represented in FIGS. 1 to 4 comprises a torch body 1, which is coupled with an exchangeable, not fully shown mixing and guiding device, the coupling being for example made by a screw-connection. The torch body has two separate gas ducts 3,3' and 4,4' for oxygen and a combustion gas such as acetylene, respectively, which ducts are formed by bores extending parallel to each other. These gas ducts have respective inlet openings 5 and 6, and respective outlet openings 7 and 8, the inlet openings being adapted for connection to an oxygen source and a combustion gas source, respectively, for example as shown in FIGS. 1 and 2 for connection to an intermediate piece 9 provided with corresponding connection threads, while the outlet openings 7, 8 are adapted for connection with corresponding openings of the mixing and guiding device 2.

Between the gas duct portions 3 and 3' on one hand and 4 and 4' on the other hand there are provided respective regulating valve and a respective shut-off valve which valves are connected with the respective gas duct portions by means of connection passages or communication passages arranged in transverse direction with respect to said gas ducts. Accordingly, the oxygen duct 3 on the inlet side leads first to an oxygen regulating valve 10 of usual construction which is shown in section in FIG. 4. From this regulating valve a communication passage 11 leads to a shut-off valve 12 and from the latter a connection passage 13 leads to portion 3' of the oxygen duct on the outlet side. Similarily, portion 4 of the combustion gas duct on the inlet side leads over a connection passage 14 to a regulating valve 15 the outlet of which is connected over a communication passage 16 with the inlet of a shut-off valve 17, the outlet of this shut-off valve communicating with portion 4' of the combustion gas duct at the outlet side.

Figure 3:
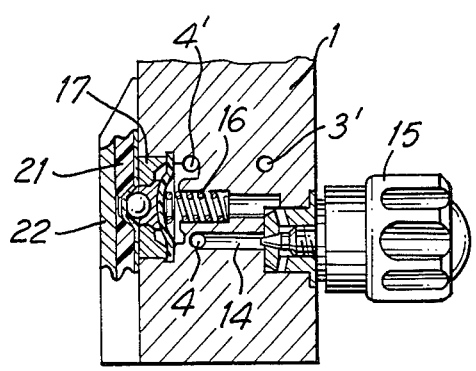
FIG. 3 shows a section along the line III—III of FIG. 2.
Figure 4:
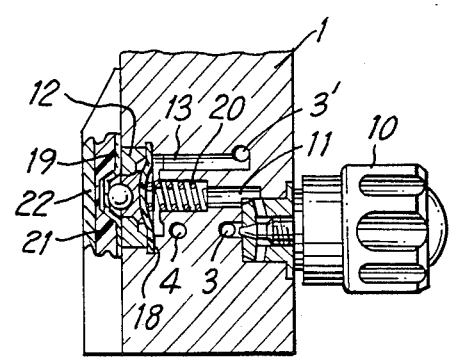
FIG. 4 shows a section along line IV—IV of FIG. 2.

As shown in particular in FIGS. 3 and 4 the shut-off valves are in the form of membrane valves, wherein a respective switching member 19 acting on a membrane 18 is movably arranged in perpendicular direction to the membrane and is maintained in a rest position by the action of a spring 20. A ball-shaped portion of the switching member protrudes from the lateral surface of the torch body 1 and cooperates with an actuating member 21 as shown in the sectional view of FIGS. 3 and 4. The actuating member 21 is pivoted in a cover part 22 and has recesses into which enters a respective protruding portion of the corresponding switching member. When the actuating member is rotated by means of a lever-shaped extension of the same, the switching member is pushed inwards and the shut-off valve thus brought in the closed position.

In the present arrangement the recess of the actuating member 21 which cooperates with the switching member of the oxygen shut-off valve is preferably so dimensioned in the direction of movement of the actuating member that the edges of the recess only act on the ball-shaped portion of the switching member once the actuating member of the combustion gas shut-off valve has already been operated. By this, one obtains in each case the effect that the flow of combustion gas in already interrupted before the flow of oxygen is shut-off and that inversely, the oxygen flow already starts before the flow of combustion gas is switched on. The described arrangement allows a dimensioning which fully complies with this purpose.

As a result from the above, the regulating valves are in the present arrangement provided upstream with respect to the corresponding shut-off valves. This allows to interrupt the gas supply, first of all the combustion gas supply, on the torch itself in the event of a backfiring that finally leads to damaging of the shut-off valves by burning the membrane.

The extremely compact structure which results from the arrangement of the regulating valves and the corresponding shut-off valves in opposite relationship to each other provides very short conduction pathes for the gas which allows to reduce the section of the ducts without having to put up with excessive friction and pressure losses and allows to attain a relatively high and also uniform gas velocity. This reduces the risk of the occurance of backfiring even at low combustion gas pressure, the use of an injector mixing device in the coupled mixing and guiding device being a particular advantage in this connection. As mentioned above, the small volume of the gas ducts also reduces the effect of a possible backfiring into the torch body so that the present torch device achieves the greatest possible safety in operation.

We claim:

1. A torch device with a torch body having separate gas ducts for oxygen and a combustion gas, wherein these gas ducts each extend between a respective inlet opening adapted for connection to a corresponding gas source and an outlet opening adapted for connection to a mixing and guiding device which can be exchangeably coupled with the torch body, and wherein in each of the gas ducts are provided a regulating valve for controlling the respective gas flow rate as well as a shut-off valve for switching the respective gas flow on and off, wherein these regulating valves are arranged contiguously on one side of the torch body, a corresponding shut-off valve being arranged on the opposite side of the torch body substantially opposite each of the regulating valves, the outlet of each of the regulating valves being connected with the inlet of the corresponding shut-off valve and the inlets of the regulating valves and the outlets of the shut-off valves communicating respectively with the inlet and outlet openings of the corresponding gas ducts, said gas ducts being formed by bores in the torch body extending substantially parallel to each other and passages for connection and communication with the regulating valves and the shut-off valves being formed by bores in the torch body extending substantially orthogonal with respect to said gas ducts, and wherein a common actuating device for the oxygen and the combustion gas shut-off valves is provided and arranged in such a way that, when switching-off, the shut-off valve for the combustion gas in completely closed before the closing of the shut-off valve for oxygen starts.

2. A torch device in accordance with claim 1, wherein said shut-off valves each comprise a movable switching member held in a rest position by the force of a spring, which switching member partly protrudes from a lateral surface of the torch body, and wherein the actuating device has an actuating member movably arranged on the said lateral surface, said actuating member having recesses which cooperate each with a corresponding protruding part of the switching members and the dimensions of which are chosen so that the desired sequence of switching operations is achieved.

3. A torch device according to claim 1, wherein said shut-off valves are formed as membrane valves.

4. The torch device according to claim 2, wherein said shut-off valves are formed as membrane valves.

* * * * *